April 2, 1935. E. M. CUMINGS 1,996,697
FISHING REEL
Filed Feb. 26, 1934
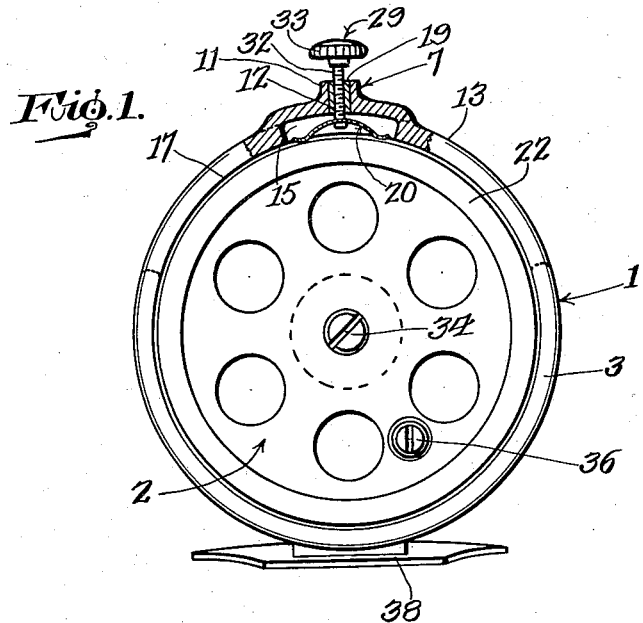
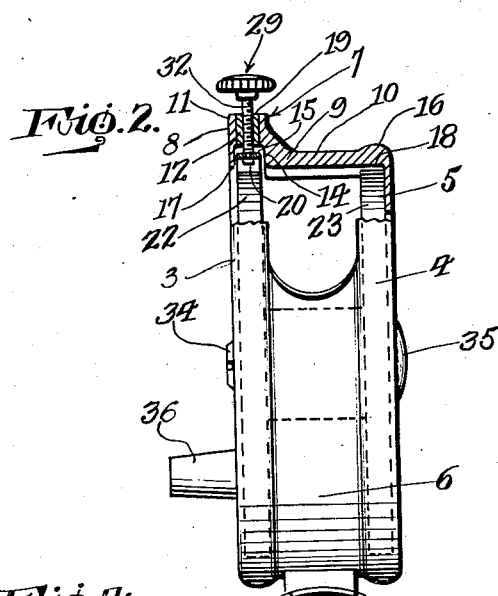
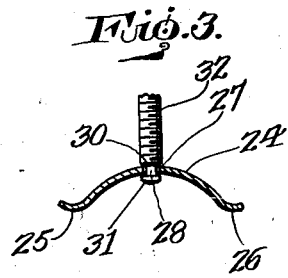
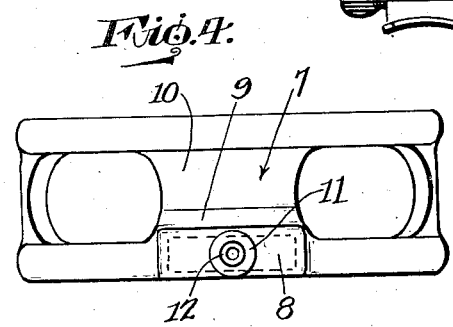
Inventor
Edward M. Cumings
By Geo. P. Kimmel
Attorney Patented Apr. 2, 1935

1,996,697

UNITED STATES PATENT OFFICE 1,996,697

FISHING REEL

Edward M. Cumings, Flint, Mich.

Application February 26, 1934, Serial No. 713,051

1 Claim. (Cl. 242—84.5)

My invention relates to a fishing reel.

As is well known, the majority of all of the complaints on the ordinary type of single action fly reels are caused by the click on the inside, and further that the small steel spring which operates the ordinary click soon becomes crystallized under the constant vibration and breaks. As far as I can see from over thirty years of trout fishing, I can find no reason whatsoever for the use of the operating spring for the click, except to act as a brake to prevent the reel from overrunning when the line is stripped out. It is the object of my invention to provide, in a manner as hereinafter set forth, a fishing reel having means to eliminate the click entirely eliminating most of the complaint or trouble as aforesaid and to act as a brake or drag for and on one side or a head of the reel drum.

A further object of my invention is to provide, in a manner as hereinafter set forth, a fishing reel including a resilient adjustable brake or drag means for and acting upon the edge of one side or a head of the reel drum.

Further objects of my invention are to provide, in a manner as hereinafter set forth, a fishing reel for the purpose referred to, which is simple in its construction and arrangement, strong, durable, compact, thoroughly efficient for the object sought thereby, readily assembled, and comparatively inexpensive to manufacture.

To the above ends essentially, and to others which may hereinafter appear, the invention consists of such parts, and such combination of parts which fall within the scope of the invention as claimed.

In the drawing:

Figure 1 is a side elevation of a fishing reel, partly in section showing the adaptation with the edge of one side or a head of the reel drum a brake or drag mechanism in accordance with my invention.

Figure 2 is an edge elevation partly in vertical section of the reel illustrating the brake or drag mechanism with respect to one side or a head of the reel drum.

Figure 3 is a fragmentary view in elevation of the brake or drag mechanism.

Figure 4 is a top plan of the reel illustrating the bridge piece which adjustably carries the brake or drag mechanism.

The reel includes a casing 1 and a drum 2 and which may be set up of any suitable material. The casing 1 includes a side 3 in the form of an annulus, a side formed of an annular portion 4 and an apertured web 5 merging into the outer part of the inner face of annular portion 4 in a manner whereby the latter will extend inwardly from its point of mergence with web 5. The side 3 and annular portion 4 are arranged in spaced alignment and the inner diameters thereof are alike. Connecting the side 3 to the annular portion 4 is a web 6 of a contour greater than a half but less than a complete circle. The web 6 is arranged inwardly with respect to the front edges of the side 3 and portion 4. At the top of the casing 1 there is arranged a bridge piece 7, spaced at its ends from the ends of web 6, of arcuate curvature in transverse cross section and which couples side 3 and portion 4 together.

The bridge piece 7 includes front, intermediate and rear portions 8, 9 and 10 respectively. The portion 8 is arranged over and has the ends of its lower face formed integral with the outer edge 13 of the side 3. The portion 8 is flush with the outer face and extends slightly inward of the inner face of side 3. The portion 8 is of rectangular contour in plan. The outer side 14 of portion 9 merges into the inner side and lower face of portion 8. The portion 9, at spaced points, also merges into the inner face of side 3 (Figure 4). In transverse cross section, the length of portion 9 is slightly less than the transverse cross sectional length of portion 8. The portion 9 has its upper face inclined downwardly from the upper face of portion 8 to the upper face of portion 10. The portion 9 in vertical section, gradually increases in height from portion 10 to portion 8. The transverse cross sectional length of portion 10 is greater than that of portion 8 or 9. The forward side of portion 10 merges into the inner side of portion 9. The inner side of portion 10 merges into the inner face of side 4 inwardly of the outer edge 16 of the latter. The portion 10 is of less height than portion 8 or 9. Formed integral with the upper face of portion 8, centrally thereof is a collar 11 providing a flush continuation of a vertical opening 12 centrally of portion 8. The lower face of portion 9 aligns with the inner edge 17 of side 3. The inner faces of portions 9, 10 are flush with each other. The inner face of portion 10 is flush with the inner edge of side 4.

The side 3 is cutout to provide in connection with the lower face of portion 8 and a part of the outer side of portion 9 a downwardly opening pocket 15 which communicates with the opening 12. Secured within collar 11 and opening 12, as well as being flush with the lower face of portion 8 and the top edge of collar 11 is an interiorly threaded sleeve 19.

Positioned within the pocket 15 is a brake or drag member 20 for the reel drum 2 and is disposed to engage the edge of one side or a head 22 of said drum. The other side or head of the drum is designated 23. The sides 22, 23 of the drum oppose the edges 17, 18 of the side 3 and portion 4 respectively. The member 20 is of curved contour and consists of an intermediate stretch 24 of convex curvature and a pair of end stretches 25, 26 of concave curvature and of materially less length than the stretch 24. The stretches 25, 26 are arranged to frictionally engage the side 22 of the drum to provide a brake or drag therefor. The stretch 24 has a central opening 27 for the passage of the reduced inner end 28 of a vertically adjustable controlling element 29 for the member 20. The reduced lower end 28 of element 29 provides a shoulder 30, and said end 28 is upset, as at 31, to provide in connection with the shoulder 30 the securing of member 20 and element 29 together, whereby on the adjusting of element 29 vertically member 20 will be carried therewith. The element 29 includes a peripherally threaded shank 32 which has threaded engagement with sleeve 19. The element 29 extends above collar 11 and carries at its inner end a finger or thumb piece 33.

Conventional means is indicated at 34, 35 for revolubly supporting the drum 2, and the latter carries a crank arm 36. The casing 1 has its bottom provided with conventional means 38 for coupling to a pole or rod.

What I claim is:—

A fishing reel comprising a casing structure formed at its top with an apertured bridge piece, a drum revolubly mounted within the casing and formed with a pair of heads, said casing at its top being provided with a pocket opposing and opening toward an edge of one of said heads, the aperture in said bridge piece opening into said pocket at the inner wall of the latter, a resilient brake member positioned in said pocket for application to said edge, shiftable means extending through said bridge piece and connected to said member for applying and releasing the latter relative to said edge, and means within said aperture for adjustably connecting said shiftable means with the bridge piece.

EDWARD M. CUMINGS.